United States Patent Office 2,992,191
Patented July 11, 1961

2,992,191
CATALYST COMPOSITION AND PREPARATION
Henry Erickson, Park Forest, Ill., assignor to Sinclair Refining Company, New York, N.Y., a corporation of Maine
No Drawing. Filed May 24, 1956, Ser. No. 586,904
6 Claims. (Cl. 252—464)

My invention relates to calcined catalyst compositions useful in reactions of petroleum hydrocarbons, particularly those conducted in the presence of free hydrogen, e.g. hydrodesulfurization, hydrogenation and hydrocracking. The catalysts are advantageously employed in the hydrodesulfurization of petroleum hydrocarbons to control sulfur in distillate fuels and to prepare charge stocks for catalytic cracking and other catalytic conversion reactions. The new calcined catalysts consist essentially of a magnesium aluminate spinel base containing as catalytically active components a metal of atomic number from 27 to 28 and vanadium or a metal of group VIa of atomic number from 42 to 74.

Most petroleum fractions contain sulfur compounds which are predominantly organic in nature and include hydrogen sulfide, alkyl and cyclic sulfides and disulfides, mercaptans, thioethers, thiophenes, thiophanes, etc. which are of varying stability. The less stable sulfur compounds are conventionally removed by various sweetening processes, and catalytic hydrodesulfurization is employed to remove the more stable sulfur compounds principally as hydrogen sulfide. These compounds are disadvantageous in stocks charged to catalytic operations as the sulfur tends to poison the catalysts. The sulfur compounds are further objectionable because of properties producing bad odors, corrosion, and engine wear and deposits. These difficulties have led to various proposals for desulfurization or hydrodesulfurization of almost all petroleum stocks including light distillates, middle and heavy distillates and even residual stocks. These fractions include as examples, gasoline, kerosenes, naphthas, diesel oils, heating oils, gas oils, residual and distillate fuel oils, lube stocks and reduced crudes. The catalyst compositions of the present invention are useful in conversion reactions employing these petroleum fractions as charge stocks; however, the catalyst compositions are particularly useful in reactions of petroleum hydrocarbons conducted in the presence of hydrogen such as hydrodesulfurization, hydrogenation and hydrocracking.

In the present invention I have found that magnesium aluminate spinel ($MgAl_2O_4$) is an efficient base for supporting certain metal components in providing calcined catalysts for hydrocarbon conversion reactions, particularly for reactions conducted in the presence of hydrogen such as the hydrodesulfurization, hydrogenation and hydrocracking of petroleum hydrocarbons. In preparing my magnesium spinel catalyst base, it is necessary to effect certain procedural operations in order to obtain the desired product. In this method I have been able to form the spinel by reacting in an aqueous medium a soluble magnesium inorganic salt and a soluble aluminum salt in which the aluminum is present in the anion. Suitable salts are exemplified by the water-soluble strongly acidic magnesium such as the chloride, nitrate or sulfate and the water-soluble alkali metal aluminates. The magnesium and aluminate salts are dissolved in an aqueous medium, and a spinel precursor is precipitated through neutralization of the aluminate by the acidic magnesium salt. Excesses of acid salt or aluminate are preferably not employed, thus avoiding the precipitation of excess alumina or magnesia.

The dried spinel precursor is not a magnesium spinel, but rather is probably a mixture such as gibbsite and brucite. I have found that the precursor can be converted to the spinel by calcination. Sitable calcination temperatures are exemplified by temperatures ranging from about 800° to 1300° F. or more. The calcination temperature should not be so high that the spinel base is sintered or destroyed.

Thus I have found that to produce my spinel base, it is necessary to supply the aluminum as the anion of a salt and to calcine a spinel precursor formed from the aluminum salt and a magnetism salt. Attempts to make the spinel base from a salt containing aluminum as a cation have not been successful. I have formed an aequeous solution of magnesium and aluminum sulfates and produced a precipitate by ammonium hydroxide addition. The precipitate was washed, dried and then calcined at 1200° F.; however, no detectable magnesium aluminate spinel was produced. On the other hand, when employing a salt containing aluminum in the anion, e.g. sodium aluminate, and similar washing and drying procedures calcination of the dried precipitate at 1200° F. for six hours gave a spinel having an average crystallite size of approximately 70 Angstroms as determined by X-ray diffraction methods.

After calcination, the catalytically active metal components are deposited on the spinel base. If desired, the base can be ground before addition of the catalytic metals and the resulting material formed into larger particles and dried before effecting the calcination which gives the final catalyst. Alternatively, the calcined base particles can be directly impregnated, dried and calcined; or directly impregnated, ground and formed into shaped particles by tabletting or extrusion and then re-calcined. After the catalytically active components are added to the base, the resulting catalyst compositions can be dried and calcined under essentially the same processing conditions employed in preparing the spinel base. In any event, the spinel precursor must be calcined before addition of the catalytic metals, and the base containing these metals must be calcined to provide the final catalyst.

In manufacturing my catalysts the preformed spinel base can be impregnated with the active catalytic component. Thus, I can mix the base with an aqueous solution of the water-soluble salts of the selected catalytically active component to absorb part or all of the solution in the base particles which are then dried and calcined. Alternatively, I can precipitate the active component on the base through neutralization of a slurry of the base and water-soluble acid salts of the active component and then dry and calcine the resulting solids. The catalytically active component of my catalyst is comprised of (1) a metal of atomic number from 27 to 28, i.e. cobalt or nickel, and (2) vanadium or a metal of group VIa of atomic number from 42 to 74, i.e. molybdenum and tungsten. Components (1) and (2) can be mixtures of the metals in these separate groups. Particularly effective combinations of these metal components are cobalt-molybdenum, nickel-vanadium and nickel-tungsten deposited in their oxide forms on the spinel base. In catalysts which exhibit their activity in the presence of free hydrogen, it is postulated that most of the active components are present during the reaction as metals, for instance, after reduction of a metal compound, either in-situ during the reaction or by pretreatment by contact with hydrogen at elevated temperature. The catalytically active metal components are ordinarily deposited on the base as the oxide, sulfide or other compound which affords the catalytically active form under the conditions of reaction.

The total amount of active components on my base can vary considerably while being sufficient to afford a substantial catalytic effect. In general, the amount of active metal is a minor proportion of the catalyst and may be as low as 0.1 weight percent of the finished catalyst. Usually the total active metal comprises from about 1 to 25 weight percent of the catalyst and each metal component (1) and (2) is at least about 0.05 weight percent of the finished catalyst.

My magnesium spinel catalyst base is particularly effective when employing mixtures of cobalt and molybdenum as the catalytically active components. This may result because these components do not dissolve in or react with my base to the same degree as they are dissolved in other bases such as alumina. Accordingly, the active components are retained near the surface of my base and are more readily available for affording the desired catalytic effect. This phenomenon may make it feasible to employ markedly less of the cobalt and molybdenum components on my base than on other bases such as alumina to produce a given effect.

In order to illustrate more specifically the preparation of my catalyst base and catalyst compositions comprising the base and the catalytically active components, as well as their method of use, the following specific examples are given but they are not to be considered limiting.

*Example I*

In sufficient $H_2O$ to form 4 liters of solution were dissolved 80 grams of sodium hydroxide and 1095 grams of Nalcat sodium aluminate (800 grams $NaAlO_2$). To this solution were added 500 milliliters of Filter-Cel (a diatomaceous earth filter aid) and the resulting material was filtered. To 8 liters of water were added over a one-half hour period 3290 milliliters of the filtrate and 3290 milliliters of a solution containing 841 grams $Mg(NO_3)_2 \cdot 6H_2O$ and 180 milliliters of concentrated nitric acid to give a precipitate. The resulting solution was adjusted to a pH of 8.0 by the addition of a few drops of nitric acid. The resulting material was filtered and the solids were washed six times with water and dried for 24 hours at 230° F. The washed and dried product was further washed until substantially free of sodium and nitrate ions. The thus washed solids were dried for 24 hours at 230° F. and then calcined for 6 hours at 1200° F. to form a catalyst base composed substantially only of magnesium-aluminate spinel which was assigned No. 550H–3036. 43.91 grams of the spinel were impregnated with cobalt and molybdenum by contact with 63 milliliters of a solution containing 20 milliliters of concentrated $NH_4OH$, 6.18 grams of $Co(NO_3)_2 \cdot 6H_2O$ and 5.5 grams of $(NH_4)_6Mo_7O_{24} \cdot 4H_2O$ (82% $MoO_3$). The impregnated solids were dried at 230° F., tabletted and then calcined for 6 hours at 900° F. The resulting catalyst analyzed as follows:

| | Weight percent |
|---|---|
| Volatile matter at 1200° F. | 0.0 |
| Co | 2.48 |
| $MoO_3$ | 9.00 |
| MgO | 23.73 |
| $Al_2O_3$ | 61.1 |

This catalyst exhibited desulfurization initial activity when treating sulfur-containing catalytic light cycle oil from Near East crude at 2 WHSV (space velocity in weight of feed/weight of catalyst/hour) at 720° F. and 450 lbs./sq. in., while recycling 700 cubic feet of overhead gases/lb. of feed. The overhead gases were predominantly hydrogen and with $H_2S$ removed before charging to the reactor. Enough fresh hydrogen was added to maintain the pressure.

This catalyst also exhibited excellent aging characteristics in the hydrodesulfurization reaction. As an example, a portion of the catalyst was ground and screened to 12 to 20 mesh. Twenty grams of the screened catalyst were placed in an aging test unit and contacted with catalytic light cycle oil from Near East crude. The cycle oil inspection was in part as follows:

| | |
|---|---|
| Gravity, ° API | 23.8 |
| Distillation, ° F.: | |
| IBP | 416 |
| 50% | 512 |
| EP | 611 |
| Sulfur, wt. percent (Braun-Shell) | 1.99 |
| Color | 2— |
| Flash, ° F. (coc) | 255 |

The feed and catalyst were contacted at 720° F., 450 p.s.i.g., 2 WHSV and 700 cubic feet of recycle gas (predominantly hydrogen with $H_2S$ removed) per barrel of feed. Fresh hydrogen was added as needed to maintain the pressure. This run continued for 685 hours at these conditions with very little change in the efficiency of the sulfur removal which was about 93 to 97%.

To exhibit the generality of the catalyst, it was deliberately fouled by reducing the recycle gas to 200 cubic feed per barrel of feed. Operation at the lower recycle ratio continued for 31 hours during which the extent of desulfurization dropped. The volume of recycle gas was then raised to 700 cubic feet per barrel for 48 hours to check catalyst activity which was still about 92.5% desulfurization. The feed was then shut off and gas recycling was continued for 1 hour to purge for regeneration. The temperature of the catalyst was raised to 900° F. and a nitrogen purge of 6 cubic feet per hour was initiated. Air was slowly added to the nitrogen to avoid a temperature rise of over 15° F. per hour until finally air alone was being fed. The air flow was continued until the temperature reached 1100° F. Nitrogen was passed over the catalyst while reducing the temperature to 720° F. Nitrogen was then purged out with hydrogen, the reactor was repressured and oil processing was resumed at the original contacting conditions. The oil was fed for an additional 272 hours and no aging trend was observed with desulfurization continuing at about 93 to 97%.

*Example II*

Another catalyst was prepared according to the procedure of Example I except that the base was contacted with just sufficient $Co(NO_3)_2 \cdot 6H_2O$ and

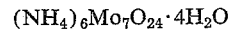

$(NH_4)_6Mo_7O_{24} \cdot 4H_2O$ (82% $MoO_3$) to give a catalyst containing 0.51% cobalt and 1.9% $MoO_3$. This catalyst also exhibited hydrodesulfurization activity.

*Example III*

212.5 grams of magnesium aluminate spinel prepared essentially as in Example I and of less than 20 mesh size is slurried in 1 liter of an aqueous solution containing 70.7 grams $Na_2V_2O_7 \cdot 8H_2O$. Over a ½ hour interval 500 ml. of an aqueous solution containing 16.8 grams $NiSO_4 \cdot 6H_2O$ is added. The slurry is stirred for one hour, filtered and the product washed free of $Na^+$ and $SO_4^=$. The filtercake is dried 24 hours at 230° F. The product is ground to pass a 20 mesh screen, blended with 4% Sterotex and formed as ⅛ x ⅛ tablets. The tablets are calcined in a muffle, the temperature being raised 300° F. per hour to 900° F. and maintained at 900° F. for 6 hours. This catalyst exhibits hydrocracking activity.

*Example IV*

218 grams of magnesium aluminate spinel prepared essentially as in Example I and of less than 20 mesh size is slurred in 1 liter of an aqueous solution containing 34.1 grams $Na_2WO_4 \cdot 2H_2O$. Over a ½ hour interval 500 ml. of an aqueous solution containing 27 grams $NiSO_4 \cdot 6H_2O$ is added. The slurry is stirred for one hour, filtered and washed free of $Na^+$ and $SO_4^=$. The product is dried for 24 hours at 230° F. The dried material is ground to pass a 20 mesh screen, blended with 4% Sterotex and formed as ⅛ x ⅛ tablets. The tablets are calcined in a muffle, the temperature of which is raised 300° F. per hour to 900° F. and maintained at 900° F. for 6 hours. This catalyst exhibits hydrocracking activity.

When my catalysts are employed in various reactions for converting petroleum hydrocarbons, conventional processing conditions can be employed. Reaction conditions to be observed in these operations can vary considerably, and are generally described as hydrodesulfurization conditions, hydrogenation conditions, hydrocracking conditions, etc. These conditions include elevated temperatures and depend upon other variables and the selection of particular operating values can be easily determined for a given reaction. Considering the hydrodesulfurization reaction, the temperature employed is usually from about 500 to 1000° F.; however, in treating charging stocks for catalytic processing the temperature is generally from about 500 to 850° F. Pressures employed can range from about 1 to 100 atmosphere with about 1 to 10 atmospheres being preferred to maintain the hydrocarbons in the vapor phase. The sulfur-containing hydrocarbon is charged to the catalyst at a rate sufficient to provide adequate contact time to effect the desired degree of desulfurization and generally ranges from about 0.1 to 20 liquid volumes of hydrocarbon per volume of catalyst per hour. The amount of free hydrogen present in the reactor will depend upon the extent of desulfurization to be effected, the composition of the charge, the amount of free hydrogen in the charge, etc. and the amount will usually vary from about 50 to 10,000 cubic feet of hydrogen per barrel of hydrocarbon present in the reactor.

The petroleum conversion reactions of this invention can be conducted in a catalyst bed which is fixed, fluidized or in any other suitable form. In fixed bed operation higher space velocities can be employed when using extruded catalysts of smallest size formed with low extrusion pressure to afford high permeability. In general, I have found that tabletting under high crushing forces gives less active catalysts of decreased permeability. Since the smaller catalyst particles are more active the use of a fluidized bed can be more advantageous since it affords maximum hydrocarbon through-put. In most cases it is more economical to regenerate the catalyst at periodic intervals coinciding with certain levels of carbon buildup on the catalyst particles. Regeneration can be accomplished by contact of the catalyst particles at elevated temperatures, e.g., from about 900 to 1100° F. with an oxygen-containing gas such as air.

This application is a continuation-in-part of application Serial No. 459,826, filed October 1, 1954, now abandoned.

I claim:
1. A calcined hydrodesulfurization catalyst consisting essentially of a crystalline magnesium aluminate spinel base, said spinel being obtained by contacting in an aqueous medium a soluble inorganic magnesium salt and a soluble salt having aluminum in the anion to precipitate a spinel precursor and calcining the precursor at a temperature from about 800 to 1300° F. to form the magnesium aluminate spinel, and a metal-containing catalytic component having at least about 0.05 weight percent of a metal of atomic number from 27 to 28 and at least about 0.05 weight percent of a metal selected from the group consisting of vanadium and the metals of group VIa having an atomic number from 42 to 74, said catalytic metals being not more than about 25 weight percent of the catalyst composition, said catalytic metals being deposited on the base after calcination to form the spinel and said calcined catalyst being provided by calcination of the base containing the catalyst metals.

2. The catalyst composition of claim 1 in which the magnesium salt is magnesium nitrate and the aluminum salt is sodium aluminate.

3. The catalyst composition of claim 1 in which the catalytic metals are cobalt and molybdenum.

4. In a method for manufacturing a calcined hydrodesulfurization catalyst composition the steps comprising contacting in an aqueous medium a soluble inorganic magnesium salt and a soluble salt having aluminum in the anion to precipitate a spinel precursor, calcining the precursor at a temperature from about 800 to 1300° F. to form a magnesium aluminate spinel, depositing on the spinel a metal-containing catalytic component having at least about 0.05 weight percent of a metal of atomic number from 27 to 28 and at least about 0.05 weight percent of a metal selected from the group consisting of vanadium and the metals of group VIa having an atomic number from 42 to 74, said catalytic metals being not more than about 25 weight percent of the catalyst composition, and calcining the resulting material at a temperature of about 800 to 1300° F. in providing the catalyst composition.

5. The method of claim 4 in which the magnesium salt is magnesium nitrate and the aluminum salt is sodium aluminate.

6. The method of claim 4 in which the catalytic metals are cobalt and molybdenum.

References Cited in the file of this patent

UNITED STATES PATENTS

| | | |
|---|---|---|
| 2,145,657 | Ipatieff et al. | Jan. 31, 1939 |
| 2,413,184 | Lande | Dec. 24, 1946 |
| 2,474,215 | Kearby | June 28, 1949 |
| 2,487,466 | Nahin | Nov. 8, 1949 |
| 2,713,586 | Calingaert | July 19, 1955 |
| 2,739,132 | Riedl | Mar. 20, 1956 |